US010990575B2

(12) United States Patent
Barry

(10) Patent No.: US 10,990,575 B2
(45) Date of Patent: Apr. 27, 2021

(54) REORGANIZATION OF DATABASES BY SECTIONING

(71) Applicant: Richard E Barry, Houston, TX (US)

(72) Inventor: Richard E Barry, Houston, TX (US)

( * ) Notice: Subject to any disclaimer, the term of this patent is extended or adjusted under 35 U.S.C. 154(b) by 196 days.

(21) Appl. No.: 16/361,541

(22) Filed: Mar. 22, 2019

(65) Prior Publication Data

US 2020/0301903 A1      Sep. 24, 2020

(51) Int. Cl.
*G06F 16/22*      (2019.01)
*G06F 9/48*       (2006.01)
*G06F 16/28*      (2019.01)

(52) U.S. Cl.
CPC ........ *G06F 16/2272* (2019.01); *G06F 9/4881* (2013.01); *G06F 16/2246* (2019.01); *G06F 16/2282* (2019.01); *G06F 16/285* (2019.01)

(58) Field of Classification Search
CPC ............. G06F 16/2246; G06F 16/2272; G06F 16/2282; G06F 16/285
USPC ....................................................... 707/696
See application file for complete search history.

(56) References Cited

U.S. PATENT DOCUMENTS

| 6,144,970 | A   | 11/2000 | Bonner et al.        |
|-----------|-----|---------|----------------------|
| 7,177,885 | B2  | 2/2007  | Isip et al.          |
| 7,548,903 | B2  | 6/2009  | Chiang et al.        |
| 7,720,876 | B2  | 5/2010  | Maxfield             |
| 8,818,953 | B2  | 8/2014  | Yingst               |
| 9,177,004 | B2* | 11/2015 | Bright ........... G06F 16/2282 |
| 9,710,751 | B2  | 7/2017  | Cichosz et al.       |
| 2005/0165713 | A1 | 7/2005 | Lafforet             |
| 2014/0149670 | A1* | 5/2014 | Ezra ............. G06F 3/0614 711/128 |
| 2017/0046364 | A1 | 2/2017 | Gajendran et al.     |
| 2017/0199925 | A1 | 7/2017 | Barry                |

FOREIGN PATENT DOCUMENTS

| CA | 2453174 A1 | 1/2003 |
|----|-----------|--------|
| JP | 5981382 B2 | 8/2016 |

* cited by examiner

*Primary Examiner* — Hung T Vy
(74) *Attorney, Agent, or Firm* — The Juhasz Law Firm

(57) ABSTRACT

Technologies are described for a system and method for reorganizing a tablespace in a database such that rows of the tablespace are arranged in a sequence defined in a balanced tree-type clustering index of the tablespace. The method includes sectioning the clustering index and the tablespace into sections including logically distinct sets of data by reading only tree pages of the clustering index to determine logical divisions. The method further includes allocating an amount of output space on a storage device for each section of the tablespace and of the clustering index, to provide for each section a first range of storage space for an output clustering index for the section, and a second range of storage space for an output tablespace for the section. The method further includes scheduling a reorg task for each section, and executing, by at least one processor, the scheduled reorg tasks on the sections.

27 Claims, 6 Drawing Sheets

REORGANIZATION OF DATABASES BY SECTIONING

BACKGROUND

Field of the Invention

The present invention relates to reorganization of databases, and in particular, using a sectioning technique to reorganize large DB2 databases.

Description of the Related Art

Tablespaces in databases are now becoming so large that conventional reorg techniques will not work. Whereas the size of these tablespaces was previously measured in megabytes (M), then in gigabytes (G), a tablespace may now be of a much larger scale, containing terabytes or even petabytes of data. The normal reorg technique is to read the data, sort it by the clustering index key value, then write the Tablespace and Clustering Index from the sorted output. Regardless of the advanced nature of modern direct-access storage device (DASD) devices, this process becomes impossible or, at least, totally impracticable with such large tablespaces. Some techniques exist to reorg a tablespace without sorting, but even these fail with the enormous sizes of the data.

SUMMARY

Technologies are described for a method of reorganizing a tablespace in a database such that rows of the tablespace are arranged in a sequence defined in a balanced tree-type clustering index of the tablespace. The method includes sectioning, by a processor, the clustering index and the tablespace into sections including logically distinct sets of data by reading only tree pages of the clustering index to determine logical divisions. The method further includes allocating, by a processor, an amount of output space on a storage device for each section of the tablespace and of the clustering index, to provide for each section a first range of storage space for an output clustering index for the section, and a second range of storage space for an output tablespace for the section. The method also includes scheduling, by a processor, a reorg task for each section, and executing, by at least one processor, the scheduled reorg tasks on the sections.

In another aspect, a system includes a storage facility storing a tablespace of a database and a balanced tree-type clustering index of the tablespace, the storage facility connected to a channel and configured to transfer data over the channel; and a computer including at least one processor, a memory, and communication circuitry connected to the channel and configured to transfer data over the channel. The computer is configured to reorganize the tablespace such that rows of the tablespace are arranged in a sequence defined in the clustering index of the tablespace by executing instructions that cause the at least one processor to: section the clustering index and the tablespace into sections comprising logically distinct sets of data by reading only tree pages of the clustering index to determine logical divisions; allocate an amount of output space on the storage facility for each section of the tablespace and of the clustering index, to provide for each section a first range of storage space for an output clustering index for the section, and a second range of storage space for an output tablespace for the section; schedule a reorg task for each section; and execute the scheduled reorg tasks on the sections.

DETAILED DESCRIPTION

Figure 1:
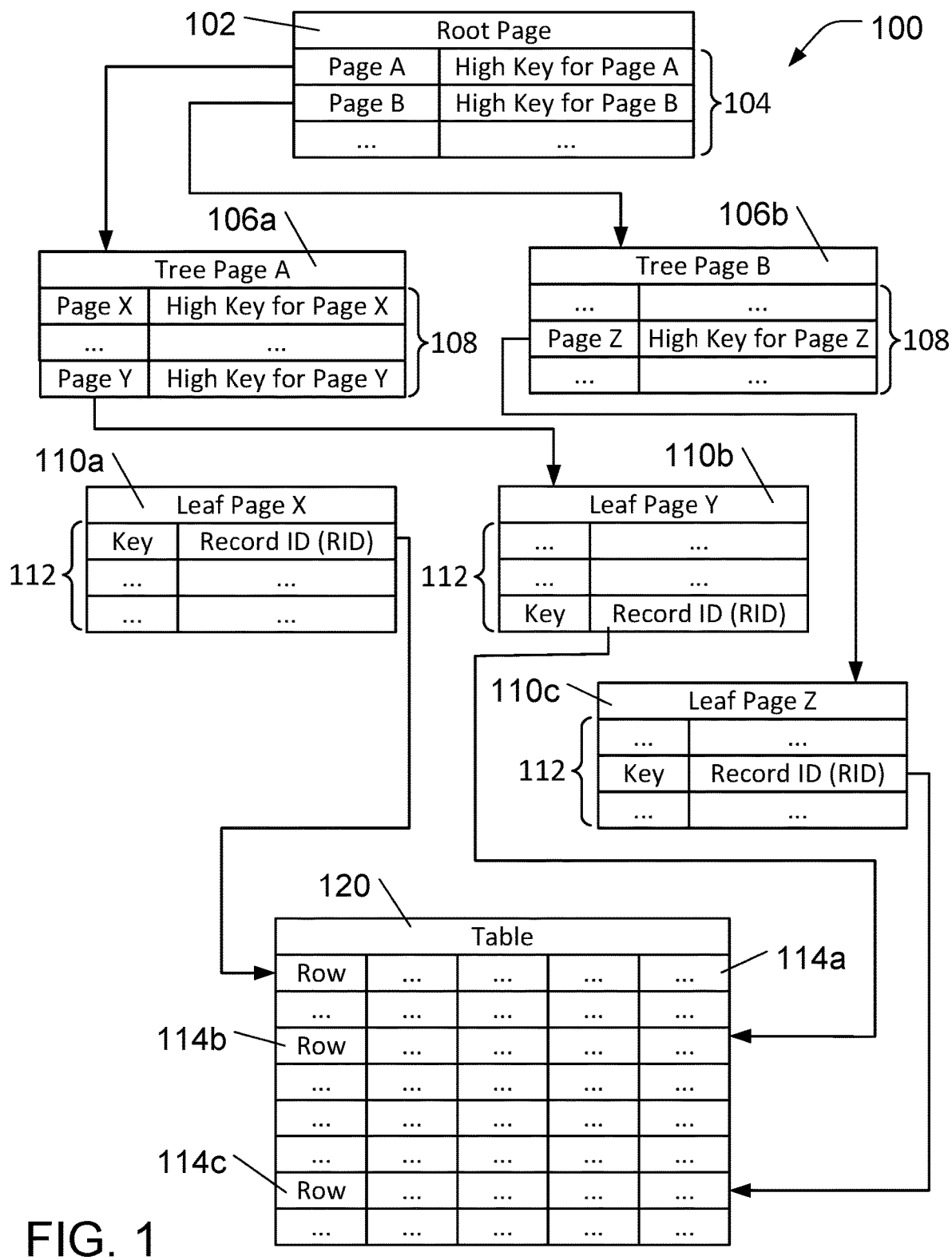
FIG. 1 shows an example of a balanced tree structure such as is used in an index of the DB2 database management system.

In the following detailed description, reference is made to the accompanying drawings that form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

Disclosed herein is a method of reorganizing a tablespace in a database such that rows of the tablespace are arranged in a sequence defined in a balanced tree-type clustering index of the tablespace. The method includes sectioning, by a processor, the clustering index and the tablespace into sections including logically distinct sets of data by reading only tree pages of the clustering index to determine logical divisions. The method further includes allocating, by a processor, an amount of output space on a storage device for each section of the tablespace and of the clustering index, to provide for each section a first range of storage space for an output clustering index for the section, and a second range of storage space for an output tablespace for the section. The method also includes scheduling, by a processor, a reorg task for each section, and executing, by at least one processor, the scheduled reorg tasks on the sections.

In another aspect, a system includes a storage facility storing a tablespace of a database and a balanced tree-type clustering index of the tablespace, the storage facility connected to a channel and configured to transfer data over the channel; and a computer including at least one processor, a memory, and communication circuitry connected to the channel and configured to transfer data over the channel. The computer is configured to reorganize the tablespace such that rows of the tablespace are arranged in a sequence defined in the clustering index of the tablespace by executing instructions that cause the at least one processor to: section the clustering index and the tablespace into sections comprising logically distinct sets of data by reading only tree pages of the clustering index to determine logical divisions; allocate an amount of output space on the storage facility for each section of the tablespace and of the clustering index, to provide for each section a first range of storage space for an output clustering index for the section, and a second range of storage space for an output tablespace for the section; schedule a reorg task for each section; and execute the scheduled reorg tasks on the sections.

As will be discussed below, a database reorg process according to the disclosure may be able to efficiently split reorg processing into independent sections, and schedule the sections for concurrent processing. Such a reorg process may, therefore, improve the functioning of the computing environment in which it is used during a database reorg process.

Embodiments in this disclosure will generally be described in terms of structures and operations provided in the DB2 database management system, by International Business Machines Corporation of Armonk, N.Y. The DB2 database management system generally runs on the Z/OS operating system, also by International Business Machines Corporation of Armonk, N.Y. It will be understood that embodiments could be used with other database management systems and/or other operating systems, provided that such database management systems include structures similar to those described herein.

Terminology used herein may be specific to the DB2 database management system and/or the Z/OS operating system. It will be understood that similar structures that are described using different terminology could be used in accordance with various embodiments. For clarity, a number of terms used herein are described below, so that readers who are unfamiliar with terminology associated with the DB2 database management system can more readily comprehend the structures and/or functions described herein.

As used herein, a "tablespace" is a dataset containing logically constructed user-defined collections of data known as "rows." Within the Z/OS operating, such a "dataset" is an object that defines a collection of data on an external device, such as a direct-access storage device (DASD).

As used herein, an "index" is a logical structure of user-defined key values that indirectly reference the tablespace rows. In the DB2 database management system, such indexes can be "clustering indexes" or "non-Clustering indexes." A "clustering index" is the index defined to control the physical ordering of the tablespace rows. That is, the database management system attempts to keep the rows in the same order as the corresponding keys in the clustering index. This provides a more linear access path to data, which may improve the performance of query operations. Additionally, because rows with similar clustering index key values are stored together, sequential detection prefetching is more efficient when clustering indexes are used. Generally, each tablespace can have only one clustering index, since the order of the rows can correspond to the order of the keys in only a single index.

For a "non-clustering index" the database management system does not maintain any order of the data in the tablespace when compared to the order of the corresponding keys of the index. A tablespace may have numerous non-clustering indexes.

For example, suppose that there is a tablespace containing rows, wherein each row describes an individual sale of an automobile. There could be numerous indexes associated with this tablespace, such as an index whose key is the seller of the car, an index whose key is the buyer of the car, and an index whose key is the model of the car. For example, the index for the model of the car would permit referencing all AUDI cars or all CADILLAC cars without needing to read the entire tablespace.

If the index whose key is the model of the car is the clustering index, then the rows in the tablespace would be physically arranged in this alphabetical order, so all the rows for AUDI cars would follow the rows for ASTIN MARTIN cars, and precede the rows for BMW cars.

When subjected to processing, the rows in the tablespace might become disordered, so that there would no longer be this strict arrangement or ordering of rows. The process of re-arranging the tablespace rows into their clustering index sequence order is known as a "reorg."

As used herein, a "section" is defined as a consecutive set of index keys of a clustering index and all the associated tablespace rows. It may also refer to a collection of pages of any type of index if the process is REORG INDEX operation in the DB2 database management system. The result of a reorg is that the sections of the clustering index would occupy a contiguous portion of the output reorged clustering index dataset, and the associated section of the tablespace would occupy a contiguous portion of the output reorged tablespace.

The DB2 database management system supports "partitioned tablespaces," wherein the database management system sections sets of tablespace rows into different datasets based on a key value derived from the row known as the "partitioning key." There is no requirement that there be a user-defined index using this partitioning key. In the example above, the partitioning key could be the automobile VIN number in user-defined ranges of VIN values.

To further assist in understanding the various embodiments described herein, examples of structures of indexes in the DB2 database management system are illustrated and described below.

FIG. 1 shows an example of a balanced tree structure 100, such as used in an index in the DB2 database management system. A root page 102 is at the top of the tree and contains entries 104 pointing to illustrative tree pages 106a and 106b. Each of the tree pages 106a and 106b contains a plurality of entries 108 that point to various leaf pages 110a-110c. Each leaf page 110a-110c contains one or more entries 112 that directly point to rows 114a-114c in the tablespace 120 with which the index is associated.

In the DB2 database management system, the entries in each individual leaf page 110a-110c are automatically kept in logical order by the system. Similarly, the entries in each of the tree pages 106a and 106b and the root page 102 are also automatically kept ordered in logical order within the page itself.

The leaf pages 110a-110c may be referred to as being at "level 1" of the balanced tree structure 100. The tree pages 106a and 106b are one level above the leaf pages, and are therefore referred to as being at "level 2" of the balanced tree structure 100, and the root page 102 is referred to as being at "level 3" of the balanced tree structure. Although this small example has only three levels of pages, in a large database, there may be many additional levels of tree pages, so that the root page of such a balanced tree structure will be at a "level" in the structure higher than 2. Additionally, it will be understood that the leaf pages, tree pages, and root page may contain many more entries than are shown in this example.

As shown in FIG. 1, the root page 102 contains a series of entries 150, wherein each entry 150 includes a page number 152 and a highest key value 154 for the page that is pointed to by the page number 152. The tree pages 106a and 106b also include a series of entries 156, wherein each entry 156 includes a page number 158 and a highest key value 160 for the page (in this case, a leaf page) that is pointed to by the page number 158. Finally, each of the leaf pages 110a-110c includes a series of entries 162, each of which includes a pointer 164 to a row 114a-114c in the tablespace 120, and a key value 166 for the row that is pointed to by the pointer 164.

It will be understood that this is a simplified view, intended only to provide an overview of a balanced tree index structure for use in understanding the embodiments of the disclosure. In an actual index used in the DB2 database management system, there may be additional information, such as various header information that is present in the root page, tree pages, and leaf pages. Additionally, there may many details, such as the use of "null" as the highest key value, or the existence of variations on the structure of the leaf nodes, which, while useful for a DB2 database management system developer to understand, are not necessary for purposes of understanding the embodiments disclosed herein. Additionally, in a DB2 index, the tree page entries include the first key of the next logical lower level page, rather than the highest key value. This has the same effect as keeping the highest key value, as described above, but may make inserting easier.

Further, it will be understood that if the index is sufficiently small, no tree pages are actually present, and the root page can actually be a leaf page. However, this is an unusual condition, and is extremely unlikely to be the case for the large databases with which the various embodiments disclosed herein are intended to be used.

A more conventional structure, as indicated before, has multiple layers of tree pages between the root page and the leaf pages. If the particular structure of the index file had three levels, then the root page would indicate the appropriate number of references to specific tree pages, which tree pages would then also contain entries to another level of tree pages, which tree pages would then finally point to the leaf pages. It is also noted that for the examples in this specification show only a very limited number of entries in each page for simplicity. It is understood that in actual use a root or tree page will contain up to thousands of entries, depending on the length of the key value, while the leaf pages may contain hundreds of entries, though normally a tree page will have approximately 100 entries and a leaf page will have approximately 70 entries.

It should be noted that in a typical index, the vast majority of pages are leaf pages. The number of tree pages as a fraction of the total number of pages in an index is normally around 0.5%. This number will vary based on many factors, including key length and the distribution of keys (specifically, how similar is the next key to the prior), since keys in the tree pages are normally forward compressed, so that only the values different at the end of a key are saved. Assuming 0.5% of all pages in an index are tree pages, a very large index of 1 T has 256M pages, of which about 1.25M will be tree pages, and about 255M will be leaf pages.

Figure 2:
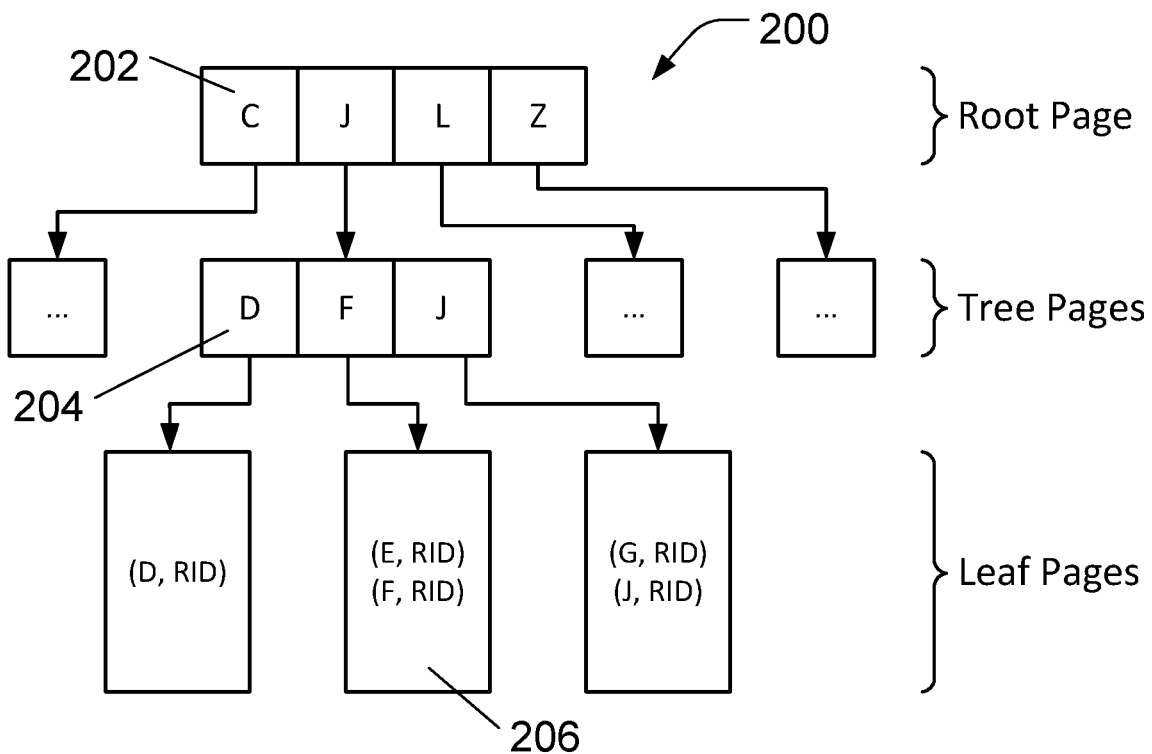
FIG. 2 illustrates an example search for a table entry in a balanced tree index structure such as is shown in FIG. 1.

FIG. 2 illustrates a search for a table entry in a balanced tree index structure such as is shown above. In particular, a search through an index in the DB2 database management system is illustrated.

For this example, a search for "E" is being conducted in the index 200 on a single character. The search would start at root page 202, and look at the highest key value for each of the pages that are pointed to by the root page 202. First, the search will determine whether "E" is equal to or before "C", which is the highest key value for the first tree page pointed to by the root page. Since this is not the case, the search will proceed to check against the highest key value for the next page. Thus, the search will check whether "E" is equal to or before "J". Since this is the case, the search through the pages pointed to by the root page 202 can stop, and the search can follow the pointer to the tree page 204.

The search can then proceed to check against each of the highest keys in the leaf pages that are pointed to by the tree page 204. This process is essentially the same as the previous. Since "E" is not equal to or before "D", the search will proceed to check against the next entry in the tree page. Because "E" is equal to or before "F", the pointer which points to the leaf page in which the highest key value is "F" will be followed to leaf page 206.

Once the correct leaf page 206 has been identified, the search will locate the key value "E" in the leaf page, and obtain the associated RID (record identifier). The RID provides the location (page and slot number) of the row in the tablespace that is indexed by the index 200 that contains the particular record.

In this example, it required only four page reads to get to a specific row. In general, the number of page reads will be proportional to a logarithmic function of the number of records indexed. This is considerably more efficient than, e.g., searching linearly through the records.

Figure 3:
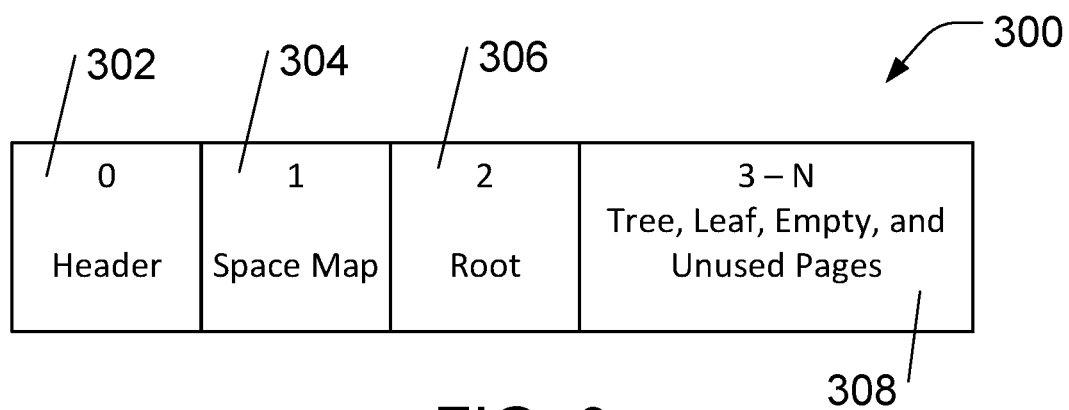
FIG. 3 shows a sequential representation of an index file in the DB2 database management system.

FIG. 3 illustrates a sequential representation of an index file in the DB2 database management system. An index file in the DB2 database management system on the Z/OS operating system is typically a virtual storage access method (VSAM) data set in a linear data set (LDS) format, which is essentially a byte-stream data set format.

The index file 300, has a first page 302. which is referred to as page 0, and which serves as a header page. This header page contains particular information needed to indicate to the various packages and programs, and particularly to the operating system of the machine, the type of file and other related information. The second page 304 of the index file 300 is a space map, which indicates which particular subsequent pages in the file are currently active for that particular index file. These subsequent pages are either tree pages (including the root page) or leaf pages. The third page 306, referred to as page 2, is the root page R. The remaining pages 308 in the index file 300 are tree, leaf, empty, and unused pages, in whatever order has developed through the use of the indexing process.

As discussed above, tablespaces are now becoming so large that conventional reorg techniques will not work. Whereas the size of these tablespaces was previously measured in megabytes (M), then in gigabytes (G), a tablespace may now be of a much larger scale, containing terabytes or even petabytes of data. The normal reorg technique is to read the data, sort it by the clustering index key value, then write the Tablespace and Clustering Index from the sorted output. Regardless of the advanced nature of modern DASD devices, this process becomes impossible or, at least, totally impracticable with such large tablespaces. Some techniques exist to reorg a tablespace without sorting, but even these fail with the enormous sizes of the data.

According to embodiments of the disclosure, a reorg operation can be accomplished on a large index or on a large index and its associated tablespace, by using a reorg with the following characteristics: objects divided into independent sections; single read of each index; single write of each index; single read of the tablespace; single write of the tablespace; parallel read and write of all objects in multiple tasks of a single processor or in multiple tasks of multiple processors connected in a SYSPLEX or other clustered, distributed, or parallel computing arrangement; no call to an external sort or sort product; and all objects remain in read/write mode throughout the process.

Figures 4, 6:
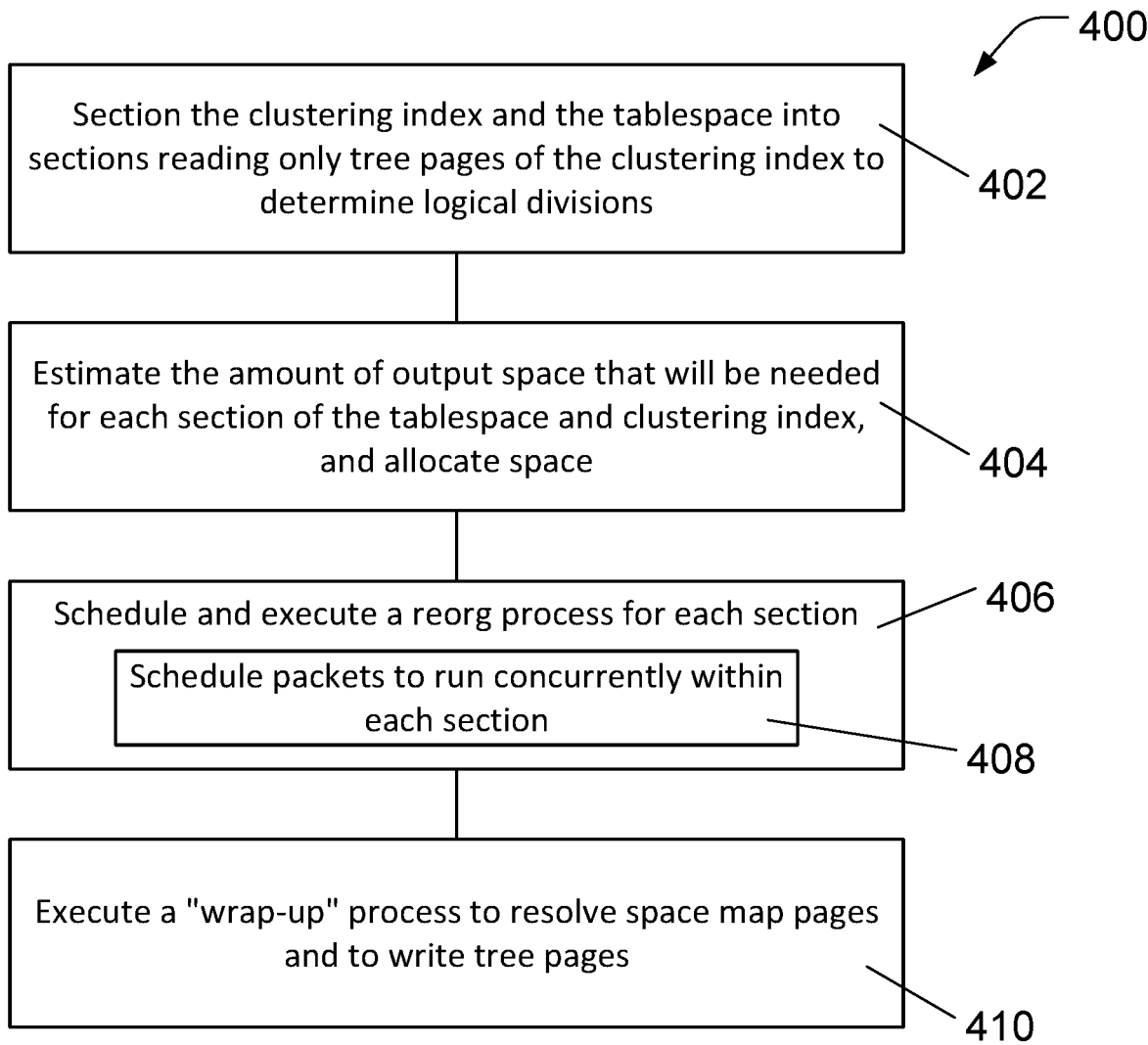
FIG. 4 shows a high-level overview of a reorg operation, in accordance with a disclosed embodiment.
FIG. 6 illustrates an example of assigning new key bitmap values, according to the process shown in FIG. 5.

FIG. 4 shows a high-level overview of such a reorg operation 400. At 402, the clustering index and the tablespace are broken up into logically distinct sets of data, referred to herein as "sections." Assigning sections may be done by reading the clustering index in logical order (i.e. key sequence) to determine logical divisions. Using current technology, this process might take several hours for a very large clustering index (e.g. 2 T), but could take much longer for a clustering index in a highly disorganized state.

In accordance with various embodiments of the disclosure, reasonably consistently-sized sections can be assigned by reading only the tree pages of the clustering index. Since, as discussed above, the tree pages make up only about 0.5% of the pages in the index (the rest being leaf pages), the number of index pages that are read for assigning sections can be kept relatively low (at least in comparison with the total size of the index), greatly reducing the amount of time that is needed for this step.

At 404, once the sections have been assigned, the reorg operation estimates, with as high a degree of accuracy as it is able to achieve, the amount of output space that will be needed for each section of the tablespace and of the clustering index. When using the Z/OS operating system, the amount of output space may be DASD space, expressed, e.g., in cylinders.

Once the amount of space has been estimated, a section can be viewed as a defined part of the clustering index-tablespace that includes a logical set of index leaf pages, a range of storage space (e.g., a range of cylinders) for the output index, and a range of storage space (e.g., a range of cylinders) for the output tablespace. Thus, each section is self-contained, with the exception of space map pages that cover pages that range across sections and the high-level tree pages of the index.

Either as part of the estimation process or as a separate process, the estimated space can be allocated on a storage device.

At 406, the reorg of each section can be scheduled, and carried out independently across multiple processors or computers in a clustered, parallel, or distributed system, such as a SYSPLEX using the Z/OS operating system. Because the sections are assigned and provided with storage space so that the sections are independent, they can be processed in parallel. Parallel processing of the sections may achieve near-linear speedup.

As will be described in greater detail hereinbelow, there may be instances in which a section does not fit within the storage space that has been allocated for it based on the estimation discussed above. In some embodiments, processing of sections may be scheduled to reduce fragmentation in the cases where the pre-assigned output storage ranges are insufficient to hold the entire section.

It should be noted that memory in a mainframe is a constant limitation, that also affects the parallel or concurrent scheduling of sections during a reorg operation. To control the memory used by each process, a reorg according to some embodiments of the disclosure may use "packets." A packet is a fixed, non-logically consistent but contiguous set of keys and rows that is a subset of a section. The packet can be seen as the unit of processing in the reorg operation, and the number of packets in active use is the number of concurrent tasks processing the index and tablespace. The size of a packet is designed to fit within a reasonable amount of memory yet produce enough data to substantially advance the work of finishing the reorg. The packet may also be used as a unit of measurement to display the progress of the work to the user.

In accordance with various embodiments, packets are a mechanism for increasing the parallel nature of the processing. As shown at the sub-process 408, numerous packets may be scheduled to run concurrently within each section. Although these packets processing within a single section will generally be scheduled to finish serially, by that time, the bulk of the computing will have been completed. In some embodiments, a packet task manager process will limit the number of concurrent packets to restrain memory usages, but as many as seven to eight packets may be active per section. While about four or five packets are doing the serial work related to writing, additional packets can be doing the input and row processing work, which, in many cases, will be substantial. This includes possible decompression, compression, discard processing, and row rebuilding due to added or dropped columns. Thus, packets are a way to both increase the parallelism, as well as to provide for greater overlap between reading and writing.

Generally, the number of packets concurrently being processed is limited by the amount of CPU memory allocated to the reorg process. Using packets, the reorg operation is able to provide a process that works within a user-defined limitation of memory, while still being able to reorg an enormous object.

At 410, in a "wrap-up" process, all the separate sections of the tablespace and index are "knitted" together to form a final version of the newly reorged tablespace and index. This generally involves resolving space map pages for the tablespace and clustering index, and writing high-level tree pages in the index.

Figure 5:
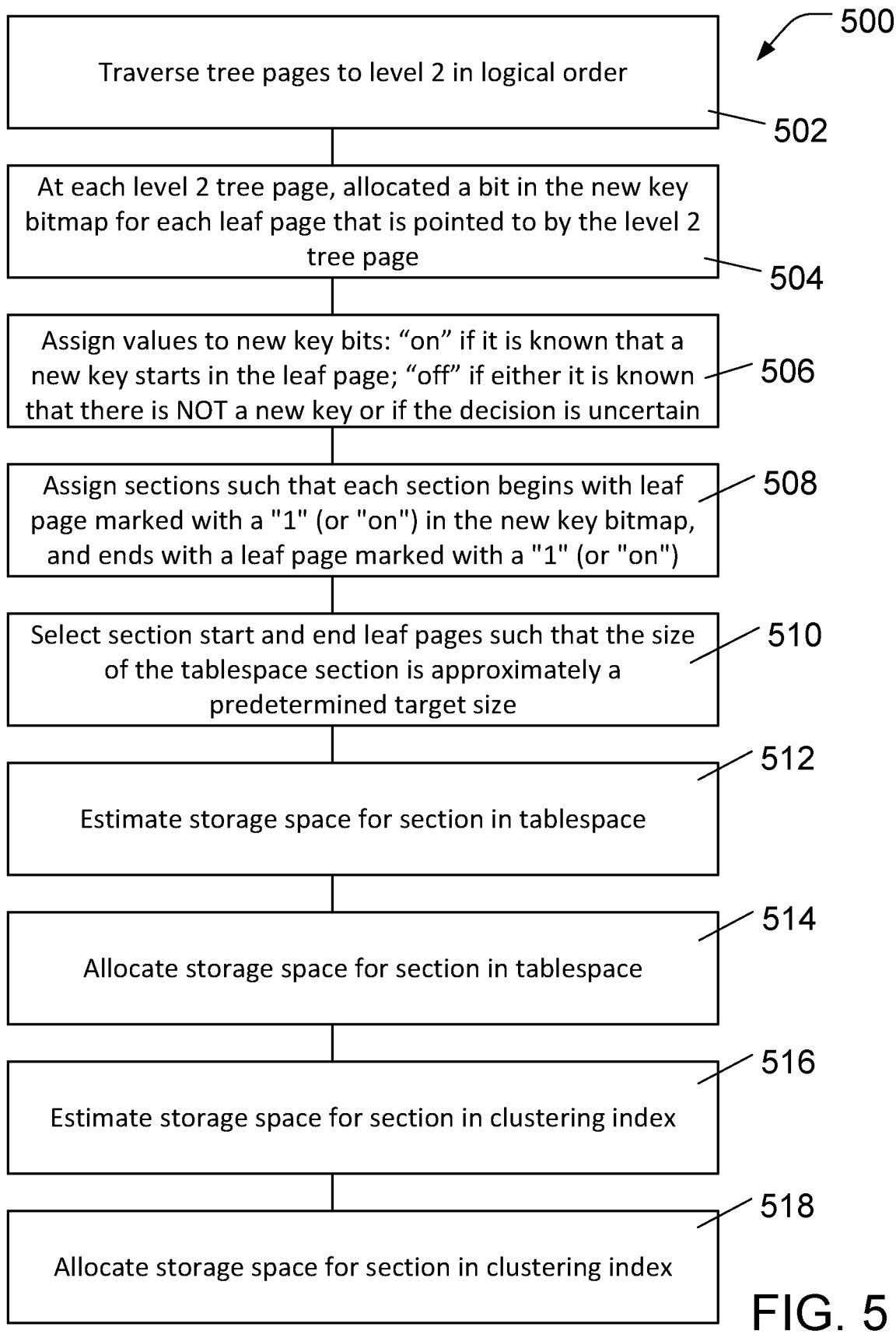
FIG. 5 shows a process for assigning or defining sections using a "new key" bitmap, in accordance with a disclosed embodiment.

FIG. 5 shows a more detailed view of a process 500 for assigning or defining sections. In accordance with various embodiments, this may be accomplished using a "new key" bitmap.

At 502, the balanced tree that forms the clustering index is traversed in logical order. If this tree traversal were to proceed to the level of the leaf pages, then the leaf pages would be read in perfect index order. Algorithms for traversing trees in this manner are well-known. In accordance with various embodiments, however, it is not necessary to read the leaf pages to form the new key bitmap. The new key bitmap may be build using information from "level 2" index pages—i.e., tree pages that are one level above the leaf pages in the balanced tree. This means that it is only the tree pages that are traversed. Because there are many fewer tree pages than leaf pages (as explained above, typically only about 0.5% of the pages in an index are tree pages), traversing this tree and building the new key bitmap may be much faster than traversing the entire tree, including the leaf pages.

At 504, at each level 2 tree page, one bit is allocated in the new key bitmap for each leaf page that is pointed to by the level 2 tree page. The bits are ordered according to the order of the leaf pages in the index logical sequence.

At 506, the bits allocated at 504 are assigned values, such that a bit is turned on if it is known for certain that a new key starts in the leaf page corresponding to that bit. The bit is left off if either it is known that there is NOT a new key or if the decision is uncertain (i.e. there is not sufficient information to know one way or the other).

Assigning these bit values is done using information present in the level 2 tree page. Each level 2 tree page includes the indexed leaf page number and the value of the first key in the logically next leaf page for each leaf page pointed to by the level 2 tree page. There is also an indicator flag marking whether or not that key is the same as the last key in the referenced leaf page (referred to herein as the "key continuation flag").

Using this information, a bit in the bitmap corresponding to a leaf page can be turned on if the leaf page is the first leaf page in the index, and, in the case of other leaf pages, if the key continuation flag of the previous leaf page is not set (i.e., the first key in the current leaf page is not the same as the last key of the previous leaf page). The bit in the bitmap corresponding to the last leaf page in the index should also be turned on. Otherwise, the bit should be left off. At the end of every level 2 tree page is a single page number without a value for the first key in the logically next leaf page, and without key continuation flag. Therefore, the bit corresponding to the next logical leaf page—i.e., the first page of the next level 2 tree page—should not be turned on.

It will be understood that in some embodiments, bitmap allocation (i.e., as in 504) and assignment of bit values (i.e., as in 506) may not be separate, so bits in the new key bitmap are simply assigned a value as they are allocated. These are shown separately here only for purposes of illustration.

For clarity of understanding, referring briefly to FIG. 6, an example of assigning new key bitmap values is described. The leaf pages pointed to by the first level 2 tree node in an index are shown in row 602, while the values of the first key in the logically next leaf page for each leaf page, along with the key continuation flag (indicated by a "+" if the flag is set) for each leaf page are shown in row 604.

As shown, it can be determined that the first key in page 4 is "B" and that the first key in pages 5 and 6 is "C". The last key in page 4 is "C" ("C+" in page 4 means the first key in page 5 is "C" and it is a continuation from the last key in page 4) and all the keys in page 5 are "C". It is not known whether there any other keys in page 6 except "C"; all the keys in page 6 might be "C" or there may be additional keys between "C" and "F".

Therefore, we know there is a new key in page 3, since it is the first leaf page in the index—so the bit corresponding to page 3 in the new key bitmap shown in row 606 can be turned on. There is also a new key in page 4, since the first key is "B" and it is not a continuation from page 3, so the bit corresponding to page 4 can be turned on. There is not a new key in page 5, and page 6 is unknown, so the bits corresponding to pages 5 and 6 cannot be turned on. The bit corresponding to page 7 will be turned on, because the "F" is not a continuation from page 6 (there is no "+" indicator on the "F"). Thus, the new key bitmap for this level 2 tree page is "11001", as shown in row 606.

Now referring back to FIG. 5, the new key bitmap can be used to assign or define sections. At 508, this involves identifying possible start and end leaf pages for sections. A section should begin with leaf page marked with a "1" (or "on") in the new key bitmap, and end with a leaf page marked with a "1" (or "on") in the new key bitmap. This means that at a later time, when the leaf pages are read, the section will start at the beginning of the first new key (we know there is one) in the leaf page at the start of the section, and end with all the keys before the first new key in the ending leaf page of the section. Subsequent sections begin on the same page on which the prior section ends.

At 510, the start and end leaf pages of a section are selected from the possible start and end leaf pages by attempting to find a section in which the size of the tablespace section (i.e., the size of the tablespace rows referenced by the leaf pages from the section start to the section end) corresponds as closely as can be found to a predetermined target size.

The intent is to determine the size of each section so as to approximately fill the target size in the tablespace. Section sizes may vary depending on the characteristics of the clustering index and the level of uniqueness of that index. The size chosen for the predetermined target size is arbitrary, but should be large enough to set a reasonable number of sections for the entire tablespace. The assigned section size for each of the sections should be large enough that the space allocated can be managed so there is no "spill" into the next section, but small enough so that there is significant parallel processing. Note that all the processing for a section is independent from any other sections as long as all the data fits into the assigned section size.

For example, for a one terabyte tablespace, if the predetermined target size is 16 G, then the reorg process will try to assign sections that will fill approximately 16 G of tablespace. Assuming that such sections can be assigned, the tablespace will have 64 16 G sections, which will allow the reorg of the tablespace to be split into as many as 64 independent tasks which may be processed in parallel.

It should be noted that in addition to defining a section, an estimate for the amount of storage space for the section is also produced at 512. The section has been defined to use an area of the output tablespace that is approximately the predetermined target size (e.g., 16 G in the example). This area will include all data and free pages and any encompassing space map pages. The size of the section may be larger, depending on occurrence of very long strings of duplicate clustering index keys. All rows for a duplicate key must be included in the same section.

At 514, once the size of a section is estimated, storage space (e.g., a range of cylinders) for the output tablespace can be allocated.

At 516, the size of the output clustering index for a section is estimated. This estimate may be based on the ratio of tablespace to index pages in the input objects. The output index section will include all new leaf pages, tree pages specific to this section, and space map pages that encompass any pages in the section.

A number of factors can contribute to an error in the estimated storage space. For example, in the DB/2 database management system, index key extension via an ALTER statement, or changes to PCTFREE (a parameter used to set a portion of each page that should be left empty) or FREEPAGE (a parameter used to specify that an empty page should be left every n pages) could cause errors in the estimated output size. The new PCTFREE and FREEPAGE have been included in the estimation of the output size, but the original values were not available, so there is no way of knowing the size of the change in these values.

At 518, once the size of the storage space for the output index section is estimated, storage space (e.g., a range of cylinders) for the output index section can be allocated.

Figure 7:
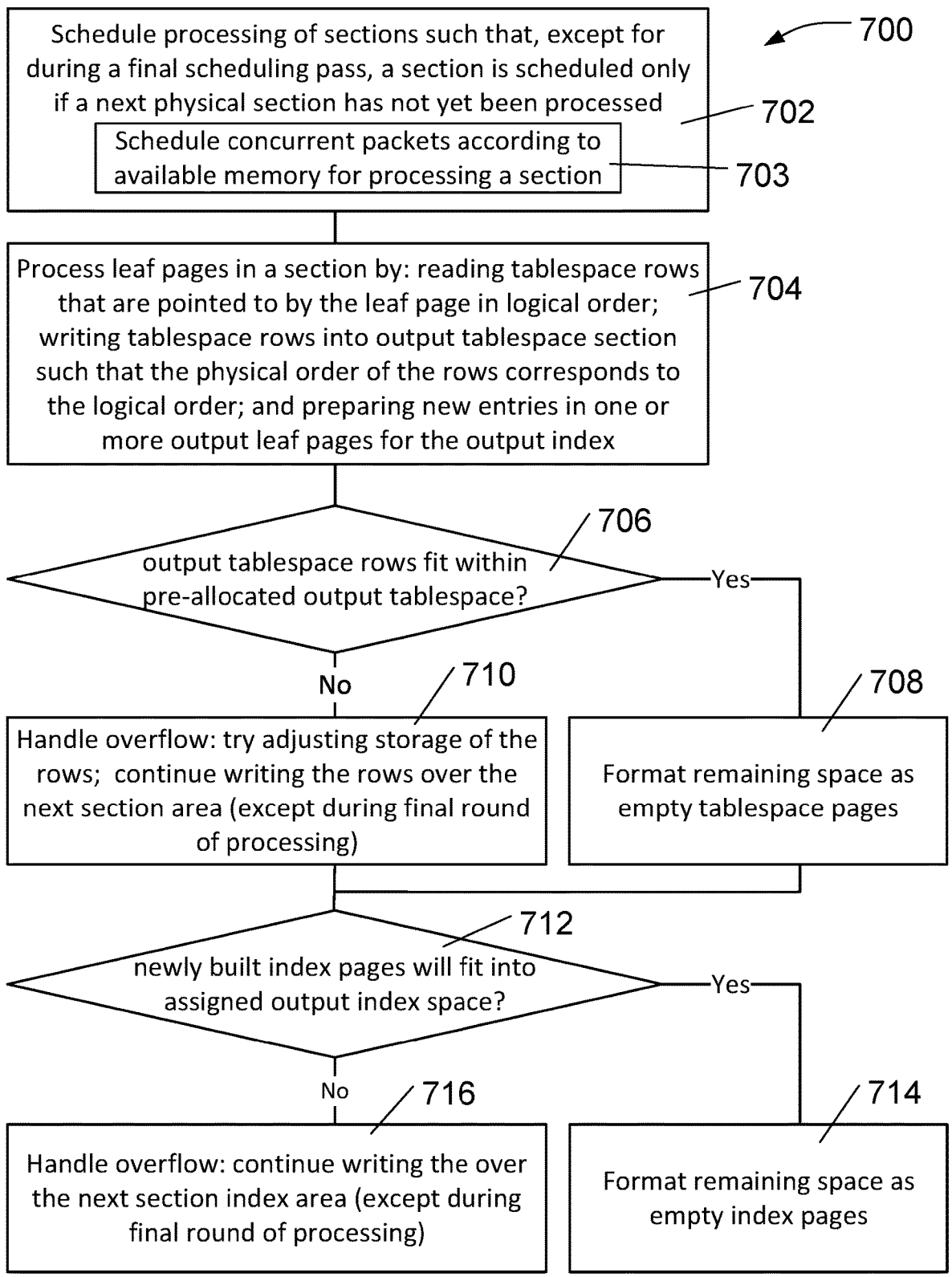
FIG. 7 shows a process of section scheduling, and of handling output tablespace and index sections that do not fit into their pre-allocated output space, in accordance with a disclosed embodiment.

FIG. 7 shows a more detailed process 700 of section scheduling, and of handling output tablespace and index sections that do not fit into their pre-allocated output space. As noted above, each section is self-contained, with the exception of Space Map pages that cover pages that range across sections and the high-level tree pages of the index. Each section can, therefore, be scheduled independently across multiple tasks, which may execute in parallel on multiple processors or computers, such as parallel, clustered, or distributed systems. For example, the tasks handling the sections could be distributed among members of a SYSPLEX under the Z/OS operating system.

It will be understood that in some embodiments, a separate scheduler or governor process may be used to handle scheduling. By using a single scheduler process to schedule processing of the sections, race conditions, such as multiple sections being processed in parallel allocating and writing the same physical tracks on a direct-access storage device may be prevented. Alternatively, other known mechanisms for avoiding such race conditions, such as semaphores or other serialization mechanisms, could be used.

At 702, processing of sections is scheduled (e.g., by a scheduler task, as discussed above), and sections are distributed among processors or computers for concurrent or parallel processing. As noted above, sections are scheduled to reduce fragmentation in the cases where the pre-assigned output space (e.g., cylinder ranges) is insufficient to hold the entire section. In accordance with various embodiments, this may be accomplished by scheduling the sections such that, except for the final scheduling pass, no section is scheduled unless the next physical section has not yet been processed. This means that section output processing can overflow into the next section's pre-assigned area. Additionally, by scheduling in this manner, race conditions are generally avoided (even without use of a separate scheduler task), except possibly during the final scheduling pass (or "round"—see below).

In accordance with some embodiments, reducing the effect of miscalculating the output sizes of sections for the index and the tablespace may be accomplished by scheduling the sections in rounds. Using the integer value of the square root of the total number of sections as the interval between sections scheduled in any round separates the processing of sections by a size large enough to compensate for varying section sizes. So, for example, a one terabyte tablespace could have 64 16 G sections (though the number and size may vary, depending on the size estimates for each section), so the interval between sections would be 8. So, sections 1, 9, 17, 25, 33, 41, 49, 57 would be scheduled on the first round, then sections 2, 10, 18, etc. on the second round, and so on. As each section completes, the actual size used is returned to the scheduler to adjust the starting position of the next physical section.

Using this method for scheduling processing of the sections, there may still be a problem with "fitting" the last round of sections into the allotted space, but the problem has been limited to a fraction of the sections—those in the last round. Also, the process of adjusting the section starting points dynamically may have the effect of smoothing out variations in tablespace row lengths in various sections.

In accordance with some embodiments, at sub-process 503, packets may also be scheduled, e.g., by a packet scheduler process, which may be a part of the scheduler process described above. The packet scheduler process will schedule packets according to the amount of available memory for processing a section. For each section, numerous (typically about four or five) packets may be scheduled to handle the serial work related to writing a section, while additional packets may be concurrently scheduled to handle input and row processing work in a section, which, in many cases, will be substantial. This includes possible decompression, compression, discard processing, and row rebuilding due to added or dropped columns.

At 704 the leaf pages in each section are processed. This involves reading a leaf page that is in the section, then reading the tablespace rows that are pointed to by the leaf page in logical order (which may not correspond to their physical order in the tablespace—hence the need for a reorg), writing the tablespace rows into the allocated space for the output tablespace section such that the physical order of the rows corresponds to the logical order, and preparing new entries in one or more output leaf pages for the output index. As output index leaf pages are completed, entries in output tree pages pointing to the output leaf pages may also be prepared.

Additionally, in leaf pages in an index of the DB2 database management system, there may be special requirements for the output index that affect section processing. In indexes in the DB2 database management system, each leaf page must contain the page number of the prior and the next logical leaf page. To accomplish this across sections, before any reading of the leaf pages, the page number of the last leaf page of a section must be assigned and stored in the first leaf page in the next section. Note that the page numbers for the previous and next leaf page are actual physical page numbers, not relative numbers, making it possible to solve the problem of a large underestimate of the number of leaf pages in a section. A large number of new output leaf pages are built and saved in memory before writing begins. If the section limit is imminent or has been exceeded, then a search is made for room from another section for the excess pages. The vast majority of the time, all the remaining pages for the index for this section will be in memory so the exact size required is known, but provision should be made for the exceptional cases.

Additionally, in the DB2 database management system, there must be compensation for the possible occurrence of a space map page. These space map pages occur at specific physical page intervals in every index, so it is generally possible to determine if one will be at the last page of the section.

Generally, the first and last leaf pages in a section are special cases, since, as explained above, the last leaf page in a section may be the same as the first leaf page in the next section. In such a case, one section ends, and the next begins at the first new key (i.e., the first key that is not continued from the previous leaf page) in the leaf page.

To handle the special cases for the first and last leaf pages in a section, in the DB2 database management system, a flag in the leaf pages, referred to as the NORIDP flag is used. The NORIDP flag normally indicates that no RID (record identifier for a row) follows the previous leaf page high key entry—i.e., the first key in the page is a new key.

If the first leaf page in the section has the NORIDP flag on, this means that the first key in this page is not a continuation of the last key in the prior leaf page, so section processing begins with the first key in the leaf page. If the first leaf page in the section does not have the NORIDP flag on, this means that the first key in the leaf page is a continuation of the last key in the prior leaf page, so section processing beings with the second key in the page. Note that in this case, since sections begin on pages where there is a changed key (see, e.g., the process described with reference to FIG. 5), there should always be a second key in the page.

If there is no second key in the page, then the tree page assignment routine is flawed, and there is a logic error that may terminate processing.

If the last leaf page in a section has the NORIDP flag on, then, as above, the first key in this page is not a continuation of the last key in the prior leaf page, so section processing ends without any processing of this leaf page. If the last leaf page in the section does not have the NORIDP flag on, then the first key in this page is a continuation of the key in the prior leaf page, so the first key is processed and then that ends section processing.

At 706, it is determined whether the newly built output tablespace rows fit within the pre-allocated output tablespace. If yes, then at 708, if there is any remaining output space, the remaining space will be formatted as empty tablespace pages. Empty space (e.g., empty cylinders) will be saved in an "overflow" bucket list. Generally, the "overflow" bucket list needs to be serialized to avoid race conditions, and (in some embodiments, as discussed above) will be handled in the separate scheduler process. For example, in embodiments using the DB2 database management system running on the
Z/OS operating system, areas of the overflow bucket list will be assigned by a single locked processor across all the concurrent section tasks, whether in the local CPU or on a remote SYSPLEX CPU. Therefore, in such embodiments, there will be an entire facility that included cross-memory WAIT and POST and SYSPLEX communication.

At 710, if the newly built tablespace rows will not fit in the assigned output tablespace, then adjustments to the storage of the rows can be used to attempt to fit the rows into the pre-allocated output tablespace for the section. In the DB2 database management system, for example, the PCTFREE and FREEPAGE values may be adjusted to attempt to fit the data into the assigned space. If these dynamic adjustments fail, then the reorg process may continue writing the rows over the next section area. No section is scheduled until the immediately prior section has completed, except for the final round of processing (see above), so it will generally be safe to take some space from the space that was pre-allocated for the next section. During the final round of processing, the section information table includes a flag indicating the space that was pre-allocated for the next section is not available. The reorg process may then signal to the scheduler that additional space is required, so the nearest "overflow" area can be assigned. When processing the section is complete, the used range of storage space (e.g., the used range of cylinders) and the free range of space are returned to the scheduler along with a completion indicator.

Incomplete space map pages are written to a small work file so they can be read by the "wrap-up" process. The "wrap-up" process is generally responsible for resolution of the space map pages for the output tablespace.

If the newly built index pages do not fill the pre-allocated output cylinders, the remaining pages will be formatted as empty index pages. Empty cylinders will be saved in the "overflow" bucket list.

At 712, it is determined whether the newly built index pages will fit into the assigned output index space. If yes, then at 714, any remaining pages will be formatted as empty index pages. Empty space (e.g., empty cylinders) will be saved in the "overflow" bucket list.

At 716, if the newly built index pages will not fit in the assigned output space, the reorg process may continue writing over the space allocated for the next index section. As with tablespace, this is generally possible because no section is scheduled until the prior section has completed, except for the final round. During the final round, the section information table includes a flag indicating the next section is not available. The reorg process will then signal to the scheduler that additional space is required so the nearest "overflow" area can be assigned.

When the section is complete, the used range of output index space (e.g., the used range of cylinders) and the free range of space are returned to the scheduler along with a completion indicator.

Incomplete space map pages and highest level tree pages (i.e., the tree pages above, e.g., level one) are written to a small work file so they can be read by the "wrap-up" process. The "wrap-up" process handles resolution of the space map pages for the output index and the highest level tree pages.

Figure 8:
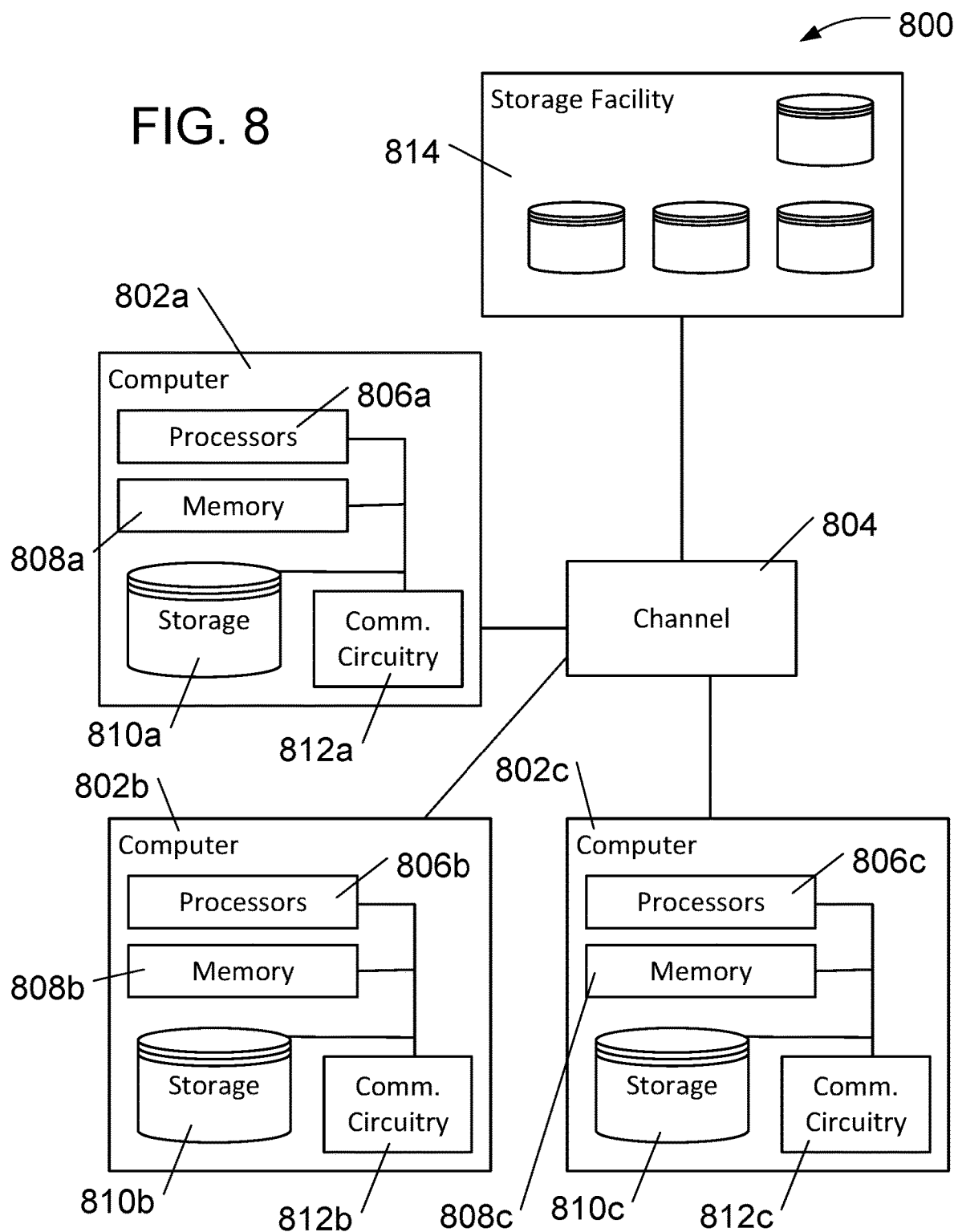
FIG. 8 shows an illustrative computing environment in which the reorg process of the various embodiments may be used.

FIG. 8 shows a computing environment 800 in which the reorg process of the various embodiments may be used. Because it is able to efficiently split reorg processing into independent sections, and schedule the sections for concurrent processing, the reorg process of the disclosure improves the functioning of the computing environment during the reorg process. While generic components are shown, it will be understood that the computing environment 800 could be, for example, a SYSPLEX or parallel SYSPLEX operating under the Z/OS operating system.

The computing environment 800 includes computers 802a-802c, which could be, for example, mainframe computers manufactured by International Business Machines Corporation, interconnected by a channel 804, which may be, e.g., a high-speed link or network. Each of the computers 802a-802c includes one or more processors 806a-806c, memory 808a-808c, optional local storage 810a-810c, and communication circuitry 812a-812c, which handles transferring data over the channel 804. It will be understood that within the computers, a variety of architectures may be used. For example, some of the memory of each computer may be shared between processors in each computer, while some of the memory of each computer may be local to each of the processors in each computer. It will further be understood that although the channel 804 is shown as a single element in the drawing, there may be various components that handle a high-speed interlink between the computers 802a-802c. For example, in some systems, specialized coupling devices (not shown) may be used to control high-speed communication traffic between the computers 802a-802c.

The computing environment 800 may also include a shared storage facility 814 which is connected to the channel 804 to provide shared data storage to the computers 802a-802c. As will be understood, there may be additional equipment involved in providing the shared storage facility 814. For example, a device (not shown) that determines whether incoming requests to the shared storage facility need to be serialized to avoid conflicts may be used in association with the shared storage facility.

There are, of course, many other computing environments with which embodiments of the disclosure could be used, and the computing environment 800 is used only for purposes of illustration. Applying the reorg methods of the disclosure by improve the functioning of many computing systems and environments, such as parallel, clustered, and distributed computing systems, during a database reorg operation.

There is thus disclosed a system of one or more computers that can be configured to perform particular operations or actions by virtue of having software, firmware, hardware, or a combination of them installed on the system that in operation causes or cause the system to perform the actions.

One or more computer programs can be configured to perform particular operations or actions by virtue of including instructions that, when executed by data processing apparatus, cause the apparatus to perform the actions.

One general aspect includes a method of reorganizing a tablespace in a database such that rows of the tablespace are arranged in a sequence defined in a balanced tree-type clustering index of the tablespace, the method including: sectioning, by a processor, the clustering index and the tablespace into sections including logically distinct sets of data by reading only tree pages of the clustering index to determine logical divisions; allocating, by a processor, an amount of output space on a storage device for each section of the tablespace and of the clustering index, to provide for each section a first range of storage space for an output clustering index for the section, and a second range of storage space for an output tablespace for the section; scheduling, by a processor, a reorg task for each section; and executing, by at least one processor, the scheduled reorg tasks on the sections. Other embodiments of this aspect include corresponding computer systems, apparatus, and computer programs recorded on one or more computer storage devices, each configured to perform the actions of the methods.

Implementations may include one or more of the following features. The method where executing, by at least one processor, the scheduled reorg tasks on the sections includes, for each section: reading a leaf page in the section; reading the tablespace rows that are pointed to by the leaf page in logical order; writing the tablespace rows into the second range of storage space for the output tablespace, such that a physical order of the rows in the second range of storage space corresponds to the logical order; and preparing new entries in one or more output leaf pages for the output clustering index. The method where writing the tablespace rows into the second range of storage space for the output tablespace includes writing into storage space allocated for a next segment when the second range of storage space is insufficient to contain the output tablespace. The method where executing, by at least one processor, the scheduled reorg tasks includes processing a plurality of the reorg tasks in parallel. The method where processing a plurality of the reorg tasks in parallel includes executing the plurality of the reorg tasks on a computing system selected from a set including a parallel computing system, a clustered computing system, and a distributed computing system. The method where executing, by at least one processor, the scheduled reorg tasks includes processing the scheduled reorg tasks on a SYSPLEX under a version of a Z/OS operating system. The method where sectioning, by a processor, the clustering index and the tablespace into sections includes assembling a new key bitmap, based on information in level 2 tree pages of the clustering index. The method where assembling the new key bitmap includes assigning a bit for each leaf page pointed to by the level 2 tree pages of the clustering index, such that the bit is on if it is known that a new key starts in the leaf page corresponding to the bit, and the bit is off if either it is known that there is not a new key in the leaf page corresponding to the bit or if the decision is uncertain. The method where sectioning, by a processor, the clustering index and the tablespace into sections further includes defining a section such that the section starts on a leaf page for which the corresponding bit in the new key bitmap is on, and ends on a leaf page for which the corresponding bit in the new key bitmap is on. The method where sectioning, by a processor, the clustering index and the tablespace into sections includes selecting start and end leaf pages for a section such that a size of the tablespace section is approximately a predetermined target size. The method where scheduling, by a processor, a reorg task for each section includes scheduling the reorg task for each section such that, except for during a final scheduling pass, the reorg task for a section is scheduled only if a next physical section has not yet been processed. The method where scheduling the reorg task for each section includes scheduling the reorg tasks in rounds, such that an interval between sections for which reorg tasks are scheduled in a round separates the sections by a size that compensates for varying section sizes. The method where the interval between sections for which reorg tasks are scheduled in a round is the integer value of the square root of a total number of sections. The method where scheduling, by a processor, a reorg task for each section includes scheduling a plurality of packets to run concurrently within each section. The method where scheduling a plurality of packets to run concurrently within each section includes scheduling at least two packets of the plurality of packets to finish serially. The method where scheduling a plurality of packets to run concurrently within each section includes scheduling at least one packet of the plurality of packets to handle writing data for the section, and scheduling at least one packet of the plurality of packets to concurrently handle row processing work within the section. The method where scheduling at least one packet of the plurality of packets to concurrently handle row processing work within the section includes scheduling a packet to handle row processing work selected from a set including of decompression, compression, discard processing, and row rebuilding. The method where scheduling a plurality of packets to run concurrently within each section includes scheduling a number of packets within a section according to a memory limitation. The method further including executing a wrap-up process to resolve space map pages for the output tablespace and for the output clustering index, and to write the highest level tree pages. The method where the database includes a version of a DB2 database management system. Implementations of the described techniques may include hardware, a method or process, or computer software on a computer-accessible medium.

One general aspect includes a system including: a storage facility storing a tablespace of a database and a balanced tree-type clustering index of the tablespace, the storage facility connected to a channel and configured to transfer data over the channel; and a computer including at least one processor, a memory, and communication circuitry connected to the channel and configured to transfer data over the channel. The computer is configured to reorganize the tablespace such that rows of the tablespace are arranged in a sequence defined in the clustering index of the tablespace by executing instructions that cause the at least one processor to: section the clustering index and the tablespace into sections including logically distinct sets of data by reading only tree pages of the clustering index to determine logical divisions; allocate an amount of output space on the storage facility for each section of the tablespace and of the clustering index, to provide for each section a first range of storage space for an output clustering index for the section, and a second range of storage space for an output tablespace for the section; schedule a reorg task for each section; and execute the scheduled reorg tasks on the sections.

Implementations may include one or more of the following features. The system where the computer is configured to execute the scheduled reorg tasks on the sections by executing instructions that cause the at least one processor to: read a leaf page in the section from the storage facility;

read the tablespace rows that are pointed to by the leaf page in logical order from the storage facility; write the tablespace rows into the second range of storage space for the output tablespace, such that the physical order of the rows in the second range of storage space corresponds to the logical order; and prepare new entries in one or more output leaf pages for the output clustering index. The system where the computer includes a plurality of processors, and where the computer is configured to execute the scheduled reorg tasks by processing a plurality of the reorg tasks in parallel on the plurality of processors. The system further including at least one additional computer connected to the channel and configured to transfer data over the channel, and where the computer is configured to execute the scheduled reorg tasks by executing a first reorg task on the computer and a second reorg task on the additional computer. The system where the computer is configured to schedule a reorg task for each section by executing instructions that cause the processor to schedule a plurality of packets to run concurrently within each section. The system where the system is configured as a SYSPLEX operating under a version of a Z/OS operating system. The system where the database includes a version of a DB2 database management system. Implementations of the described techniques may include hardware, a method or process, or computer software on a computer-accessible medium.

Various other components and processes may be included and called upon for providing for aspects of the teachings herein. For example, additional materials, processes, combinations of materials, combinations of processes, and/or omission of materials or processes may be used to provide for added embodiments that are within the scope of the teachings herein.

Standards for performance, selection of materials, functionality, and other discretionary aspects are to be determined by a user, designer, manufacturer, or other similarly interested party. Any standards expressed herein are merely illustrative and are not limiting of the teachings herein.

When introducing elements of the present invention or the embodiment(s) thereof, the articles "a," "an," and "the" are intended to mean that there are one or more of the elements. Similarly, the adjective "another," when used to introduce an element, is intended to mean one or more elements. The terms "including" and "having" are intended to be inclusive such that there may be additional elements other than the listed elements.

While the invention has been described with reference to illustrative embodiments, it will be understood by those skilled in the art that various changes may be made and equivalents may be substituted for elements thereof without departing from the scope of the invention. Although the title of the invention is "REORGANIZATION OF DATABASES BY SECTIONING", this title is not intended to be limiting, and instead refers to particular examples described herein. Similarly, the field of the invention and description of related art are not intended to be limiting. As discussed above, while examples relating to the DB2 database management system running under the Z/OS operating system are discussed, it will be understood that the various teachings provided herein could also be applied to other database systems having similar clustering indexes and running under different operating systems or in different operating environments. In addition, many modifications will be appreciated by those skilled in the art to adapt a particular instrument, situation, process, or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method of reorganizing a tablespace in a database such that rows of the tablespace are arranged in a sequence defined in a balanced tree-type clustering index of the tablespace, the method comprising:
    sectioning, by a processor, the balanced tree-type clustering index and the tablespace into sections comprising logically distinct sets of data by reading only tree pages of the balanced tree-type clustering index to determine logical divisions;
    allocating, by a processor, an amount of output space on a storage device for each section of the tablespace and of the balanced tree-type clustering index, to provide for each section a first range of storage space for an output clustering index for the section, and a second range of storage space for an output tablespace for the section;
    scheduling, by a processor, a reorg task for each section; and
    executing, by at least one processor, the scheduled reorg tasks on the sections.

2. The method of claim 1, wherein executing, by at least one processor, the scheduled reorg tasks on the sections comprises, for each section:
    reading a leaf page in the section;
    reading the tablespace rows that are pointed to by the leaf page in logical order;
    writing the tablespace rows into the second range of storage space for the output tablespace, such that a physical order of the rows in the second range of storage space corresponds to the logical order; and
    preparing new entries in one or more output leaf pages for the output clustering index.

3. The method of claim 2, wherein writing the tablespace rows into the second range of storage space for the output tablespace comprises writing into storage space allocated for a next segment when the second range of storage space is insufficient to contain the output tablespace.

4. The method of claim 1, wherein executing, by at least one processor, the scheduled reorg tasks comprises processing a plurality of the reorg tasks in parallel.

5. The method of claim 4, wherein processing a plurality of the scheduled reorg tasks in parallel comprises executing the plurality of the scheduled reorg tasks on computing system selected from a set consisting of a parallel computing system, a clustered computing system, and a distributed computing system.

6. The method of claim 1, wherein executing, by at least one processor, the scheduled reorg tasks comprises processing the scheduled reorg tasks on a SYSPLEX under a version of a Z/OS operating system.

7. The method of claim 1, wherein sectioning, by the processor, the balanced tree-type clustering index and the tablespace into sections comprises assembling a new key bitmap, based on information in level 2 tree pages of the balanced tree-type clustering index.

8. The method of claim 7, wherein assembling the new key bitmap comprises assigning a bit for each leaf page pointed to by the level 2 tree pages of the balanced tree-type clustering index, such that the bit is "on" if it is known that a new key starts in the leaf page corresponding to the bit, and the bit is "off" if either it is known that there is not a new key in the leaf page corresponding to the bit or if there is uncertainty.

9. The method of claim 8, wherein sectioning, by the processor, the balanced tree-type clustering index and the tablespace into sections further comprises defining a section such that the section starts on a leaf page for which the corresponding bit in the new key bitmap is "on", and ends on a leaf page for which the corresponding bit in the new key bitmap is "on".

10. The method of claim 1, wherein sectioning, by the processor, the balanced tree-type clustering index and the tablespace into sections comprises selecting start and end leaf pages for a section such that a size of the tablespace section is approximately a predetermined target size.

11. The method of claim 1, wherein scheduling, by the processor, the reorg task for each section comprises scheduling the reorg task for each section such that, except for during a final scheduling pass, the reorg task for a section is scheduled only if a next physical section has not yet been processed.

12. The method of claim 11, wherein scheduling, by the processor, the reorg task for each section comprises scheduling the reorg tasks in rounds, such that an interval between sections for which the reorg tasks are scheduled in a round separates the sections by a size that compensates for varying section sizes.

13. The method of claim 12, wherein the interval between sections for which reorg tasks are scheduled in the round is an integer value of a square root of a total number of sections.

14. The method of claim 1, wherein scheduling, by the processor, the reorg task for each section comprises scheduling a plurality of packets to run concurrently within each section.

15. The method of claim 14, wherein scheduling the plurality of packets to run concurrently within each section comprises scheduling at least two packets of the plurality of packets to finish serially.

16. The method of claim 14, wherein scheduling the plurality of packets to run concurrently within each section comprises scheduling at least one packet of the plurality of packets to handle writing data for the section, and scheduling at least one packet of the plurality of packets to concurrently handle row processing work within the section.

17. The method of claim 16, wherein scheduling the at least one packet of the plurality of packets to concurrently handle row processing work within the section comprises scheduling the at least one packet to handle row processing work selected from a set consisting of decompression, compression, discard processing, and row rebuilding.

18. The method of claim 14, wherein scheduling the plurality of packets to run concurrently within each section comprises scheduling a number of packets within a section according to a memory limitation.

19. The method of claim 1, further comprising executing a wrap-up process to resolve space map pages for the output tablespace and for the output clustering index, and to write at least one highest level tree page.

20. The method of claim 1, wherein the database comprises a version of a DB2 database management system.

21. A system comprising:
a storage facility storing a tablespace of a database and a balanced tree-type clustering index of the tablespace, the storage facility connected to a channel and configured to transfer data over the channel; and
a computer comprising at least one processor, a memory, and communication circuitry connected to the channel and configured to transfer data over the channel;
wherein the computer is configured to reorganize the tablespace such that rows of the tablespace are arranged in a sequence defined in the balanced tree-type clustering index of the tablespace by executing instructions that cause the at least one processor to:
section the balanced tree-type clustering index and the tablespace into sections comprising logically distinct sets of data by reading only tree pages of the balanced tree-type clustering index to determine logical divisions;
allocate an amount of output space on the storage facility for each section of the tablespace and of the balanced tree-type clustering index, to provide for each section a first range of storage space for an output clustering index for the section, and a second range of storage space for an output tablespace for the section;
schedule a reorg task for each section; and
execute the scheduled reorg tasks on the sections.

22. The system of claim 21, wherein the computer is configured to execute the scheduled reorg tasks on the sections by executing instructions that cause the at least one processor to:
read a leaf page in the section from the storage facility;
read the tablespace rows that are pointed to by the leaf page in logical order from the storage facility;
write the tablespace rows into the second range of storage space for the output tablespace, such that a physical order of the rows in the second range of storage space corresponds to the logical order; and
prepare new entries in one or more output leaf pages for the output clustering index.

23. The system of claim 21, wherein the computer comprises a plurality of processors, and wherein the computer is configured to execute the scheduled reorg tasks by processing a plurality of the reorg tasks in parallel on the plurality of processors.

24. The system of claim 21, further comprising at least one additional computer connected to the channel and configured to transfer data over the channel, and wherein the computer is configured to execute the scheduled reorg tasks by executing a first reorg task on the computer and a second reorg task on the additional computer.

25. The system of claim 21, wherein the computer is configured to schedule a reorg task for each section by executing instructions that cause the processor to schedule a plurality of packets to run concurrently within each section.

26. The system of claim 21, wherein the system is configured as a SYSPLEX operating under a version of a Z/OS operating system.

27. The system of claim 21, wherein the database comprises a version of a DB2 database management system.

* * * * *